(12) United States Patent
Liao

(10) Patent No.: US 9,804,363 B2
(45) Date of Patent: Oct. 31, 2017

(54) OPTICAL LENS

(71) Applicant: Young Optics Inc., Hsinchu (TW)

(72) Inventor: Chen-Cheng Liao, Hsinchu (TW)

(73) Assignee: YOUNG OPTICS INC., Hsinchu (TW)

( * ) Notice: Subject to any disclaimer, the term of this patent is extended or adjusted under 35 U.S.C. 154(b) by 0 days.

(21) Appl. No.: 14/882,850

(22) Filed: Oct. 14, 2015

(65) Prior Publication Data

US 2016/0116714 A1  Apr. 28, 2016

(30) Foreign Application Priority Data

Oct. 22, 2014  (TW) .............. 103136536 A

(51) Int. Cl.
*G02B 13/18* (2006.01)
*G02B 3/02* (2006.01)
*G02B 9/60* (2006.01)
*G02B 13/00* (2006.01)

(52) U.S. Cl.
CPC ........... *G02B 13/0045* (2013.01); *G02B 9/60* (2013.01)

(58) Field of Classification Search
CPC .............................. G02B 13/0045; G02B 9/60
USPC .................................. 359/714, 753, 763, 764
See application file for complete search history.

(56) References Cited

U.S. PATENT DOCUMENTS

| | | | |
|---|---|---|---|
| 7,502,181 B2 | 3/2009 | Shinohara | |
| 7,826,151 B2 | 11/2010 | Tsai-Han | |
| 7,864,454 B1 | 1/2011 | Tang et al. | |
| 7,911,711 B1 | 3/2011 | Tang et al. | |
| 8,035,723 B2 | 10/2011 | Sano et al. | |
| 2007/0229984 A1* | 10/2007 | Shinohara ............... | G02B 9/60 359/763 |
| 2013/0170048 A1* | 7/2013 | Lai ..................... | G02B 13/0045 359/714 |
| 2013/0229718 A1* | 9/2013 | Tsai .................... | G02B 13/0045 359/714 |

FOREIGN PATENT DOCUMENTS

| | | | |
|---|---|---|---|
| JP | 5428240 B2 * | 2/2014 | ............. G02B 13/00 |
| JP | 2014041388 | 3/2014 | |
| TW | 201235694 | 9/2012 | |
| TW | I424216 | 1/2014 | |
| TW | I431311 | 3/2014 | |

* cited by examiner

*Primary Examiner* — William Choi
(74) *Attorney, Agent, or Firm* — WPAT, PC

(57) ABSTRACT

An optical lens includes a first lens, a second lens, a third lens, a fourth lens and a fifth lens arranged sequentially along an optical axis from a magnified side to a minified side. A center thickness of the first lens is TH1, a center thickness of the second lens is TH2, a center thickness of the third lens is TH3, a center thickness of the fourth lens is TH4, a center thickness of the fifth lens is TH5, and an effective focal length of the optical lens is EFL, wherein the optical lens fits at least one of the following conditions: (1) 0.52<(TH1+TH2+TH3)/EFL<1.0; (2) 0.5<(TH3+TH4+TH5)/EFL<0.65; and (3) (TH1+TH2+TH3)/(TH3+TH4+TH5)>1.20. The optical lens can reduce aberration and has high resolution.

20 Claims, 6 Drawing Sheets

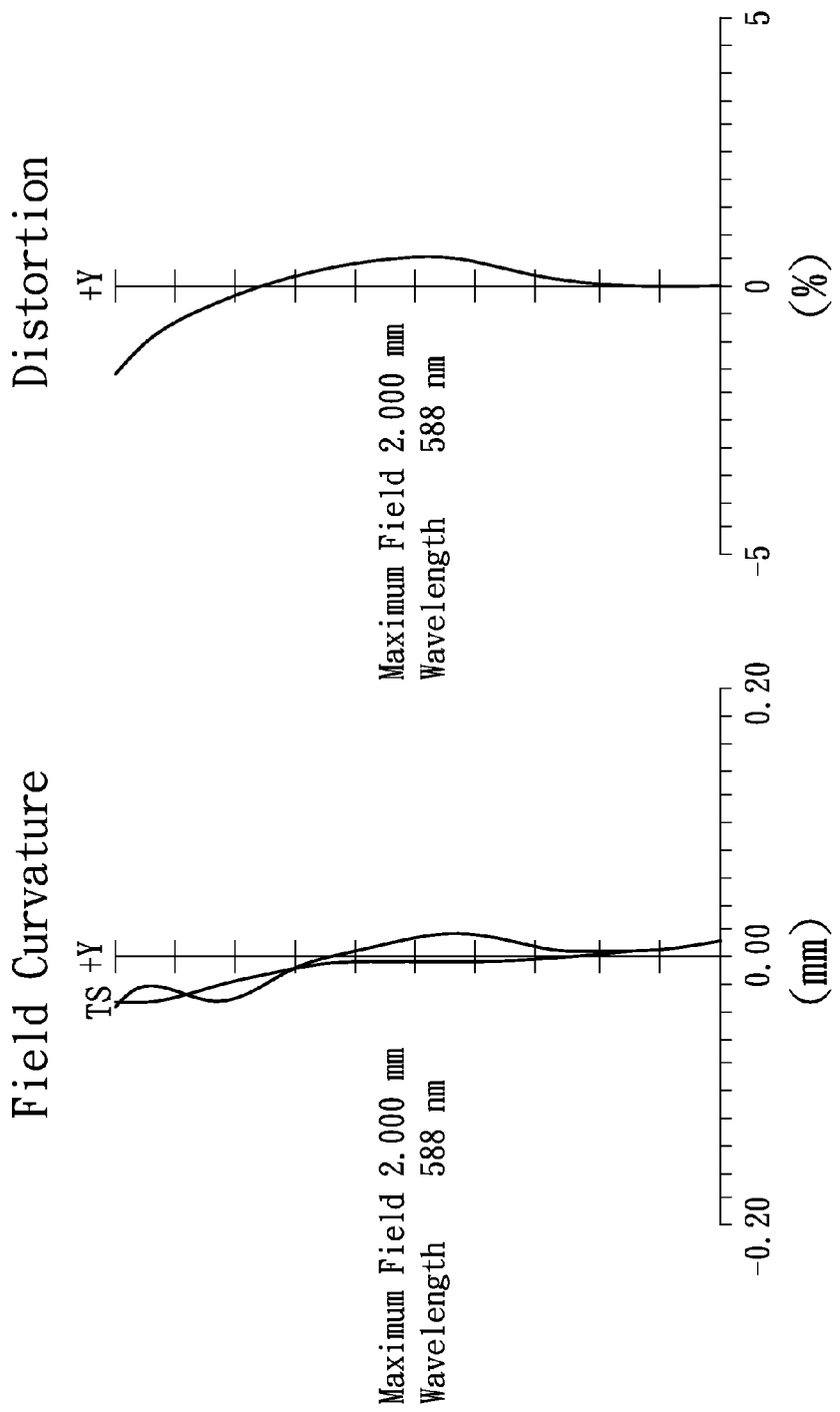

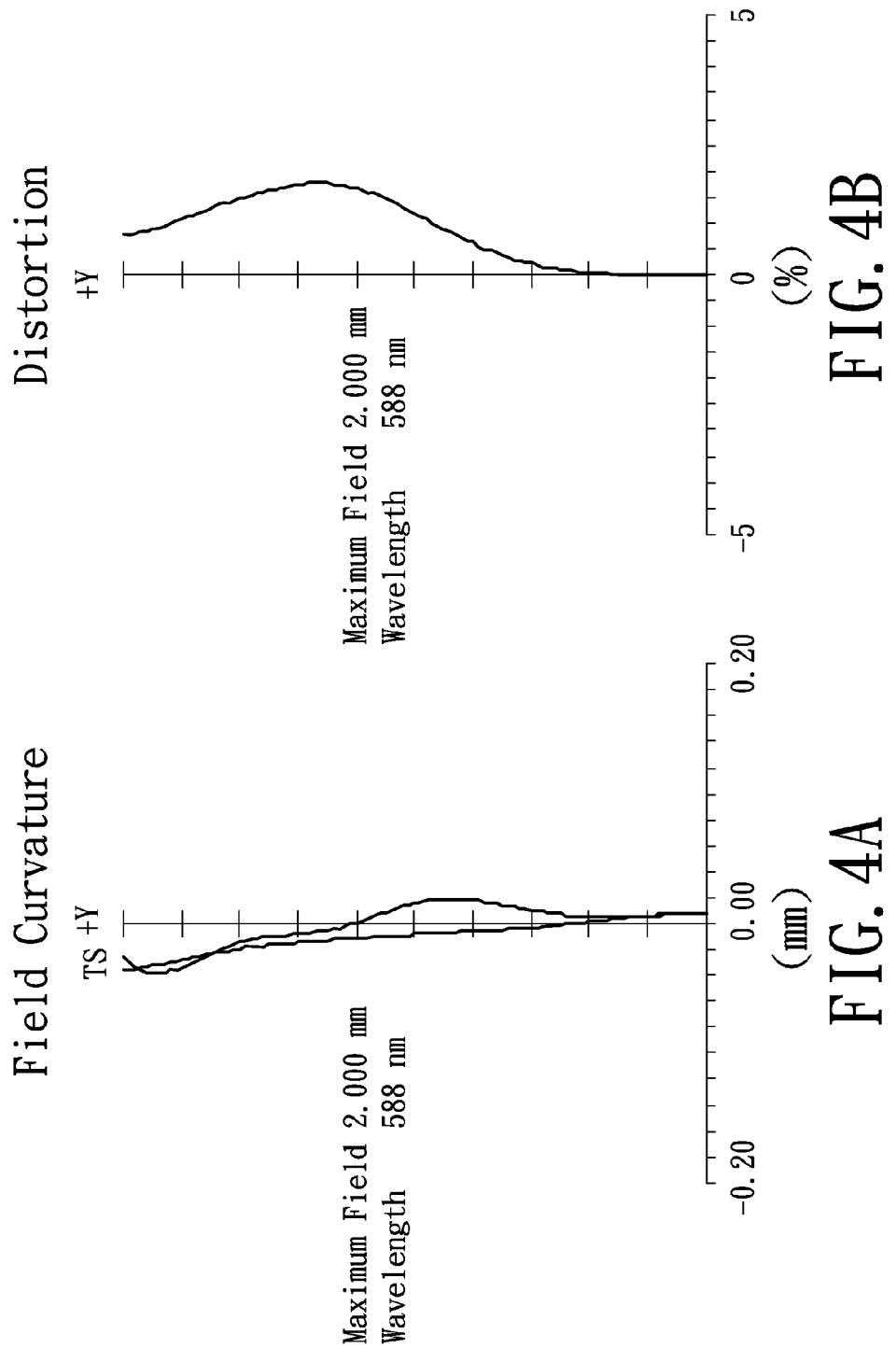

OPTICAL LENS

FIELD OF THE INVENTION

The present invention relates to an optical element, and more particularly to an optical lens.

BACKGROUND OF THE INVENTION

With recent advances in technology, mobile phones, digital cameras and other portable electronic devices continue to flourish. In order to satisfy the thinning tendency of the mobile phones and the digital cameras, the demands for compact image sensor modules are increased. Meanwhile, with technological advances and size reductions of image sensing elements, such as charge coupled device (CCD) or complementary metal-oxide semiconductor image sensor (CMOS image sensor), to correspondingly reduce the length of the optical lens installed inside of the image sensor module is needed.

To avoid from shooting with poor quality, while reducing the length of the optical lens, the optical lens should still have great optical performance. Therefore, the amount of lens of the conventional optical lens increases gradually from 2-3 for reducing aberration and reaching the resolution which fits the imaging sensing element. However, to excessively increase the amount of the lens will cause the length of the optical lens to be too long. Therefore, how to reach balance between the length and optical performance of the optical lens is a problem in optical lens design.

SUMMARY OF THE INVENTION

The present invention is directed to an optical lens having a short length and good optical performance.

One embodiment of the present invention provides an optical lens which includes a first lens, a second lens, a third lens, a fourth lens and a fifth lens arranged sequentially along an optical axis from an magnified side to a minified side. A center thickness of the first lens is TH1, a center thickness of the second lens is TH2, a center thickness of the third lens is TH3, a center thickness of the fourth lens is TH4, a center thickness of the fifth lens is TH5, and an effective focal length of the optical lens is EFL, wherein the optical lens fits at least one of the following conditions: (1) $0.52<(TH1+TH2+TH3)/EFL<1.0$; (2) $0.5<(TH3+TH4+TH5)/EFL<0.65$; and (3) $(TH1+TH2+TH3)/(TH3+TH4+TH5)>1.20$.

The optical lens of one embodiment of the present invention can reduce aberration and has high resolution via the first, second, third, fourth and fifth lenses which have the positive, negative, positive, negative and negative refractive power, respectively. Moreover, the optical lens fits at least one of the following conditions: $0.52<(TH1+TH2+TH3)/EFL<1.0$; $0.5<(TH3+TH4+TH5)/EFL<0.65$; and $(TH1+TH2+TH3)/(TH3+TH4+TH5)>1.20$, and therefore the optical lens can have a short total length, and be easily manufactured.

BRIEF DESCRIPTION OF THE DRAWINGS

The present invention will become more readily apparent to those ordinarily skilled in the art after reviewing the following detailed description and accompanying drawings, in which:

FIG. 2A is a field curvature diagram of an optical lens in accordance with an embodiment of the present invention;

FIG. 2B is a distortion diagram of an optical lens in accordance with an embodiment of the present invention;

FIG. 4A is a field curvature diagram of an optical lens in accordance with another embodiment of the present invention;

FIG. 4B is a distortion diagram of an optical lens in accordance with another embodiment of the present invention.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
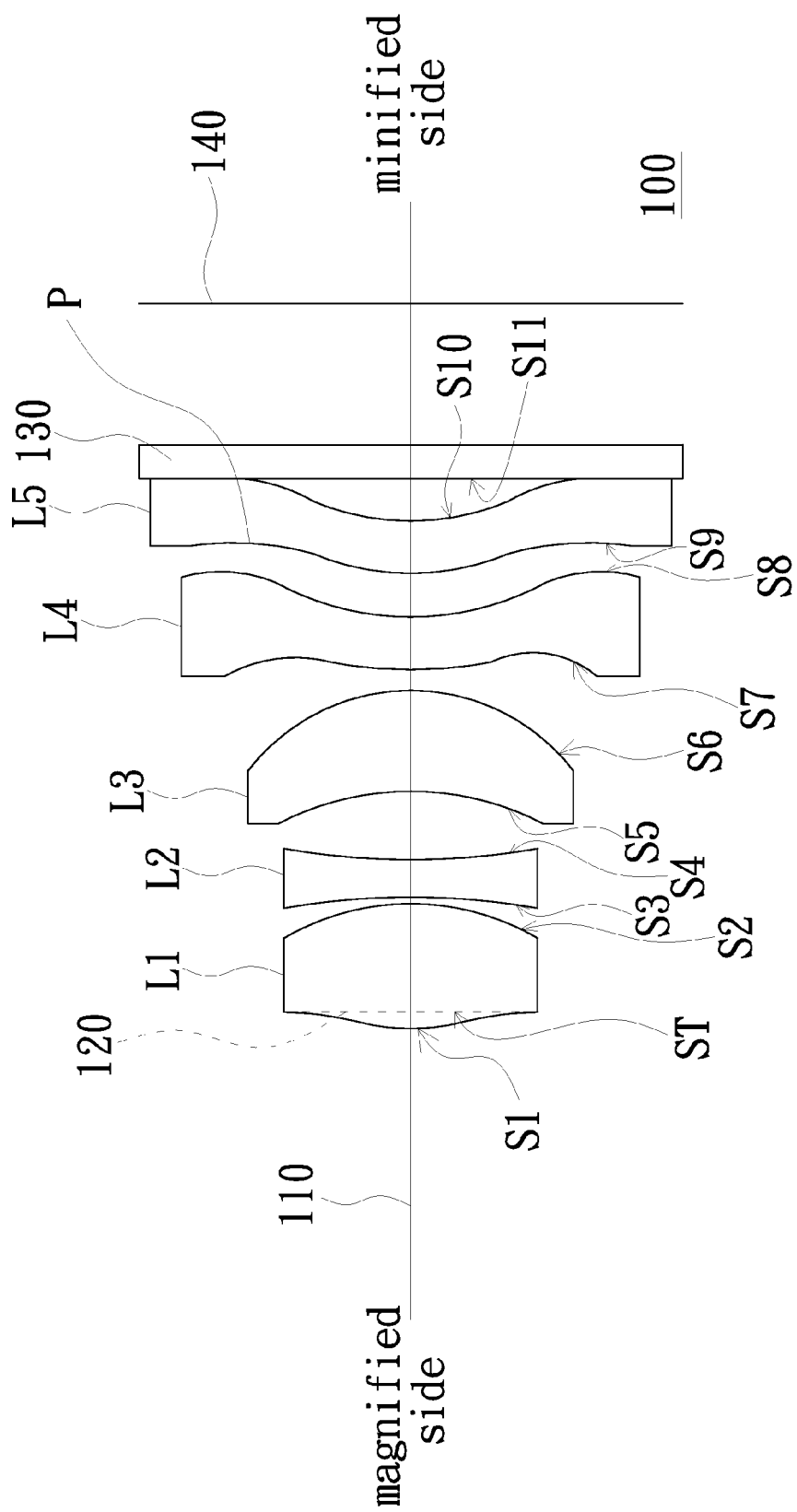
FIG. 1 is a schematic structural view of an optical lens in accordance with an embodiment of the present invention.

Please refer to FIG. 1, which is a schematic structural view of an optical lens in accordance with an embodiment of the present invention. As shown in FIG. 1, the optical lens 100 in the present embodiment includes a first lens L1, a second lens L2, a third lens L3, a fourth lens L4 and a fifth lens L5 arranged sequentially along an optical axis 110 from a magnified side to a minified side. A center thickness of the first lens L1 (along the optical axis 110) is TH1, a center thickness of the second lens is TH2, a center thickness of the third lens is TH3, a center thickness of the fourth lens is TH4, a center thickness of the fifth lens is TH5, an effective focal length of the optical lens 100 is EFL, and the optical lens fits at least one of the following conditions: (1) $0.52<(TH1+TH2+TH3)/EFL<1.0$; (2) $0.5<(TH3+TH4+TH5)/EFL<0.65$; and (3) $(TH1+TH2+TH3)/(TH3+TH4+TH5)>1.20$.

In this embodiment, the first lens L1, for instance, has positive refractive power, the second lens L2, for instance, has negative refractive power, the third lens L3, for instance, has positive refractive power, the fourth lens L4, for instance, has negative refractive power, and the fifth lens L5, for instance, has negative refractive power. The first lens L1, for instance, is a biconvex lens for providing refractive power to the optical lens 100. The first lens L1 includes a first surface S1 and a second surface S2, and at least one of the first surface S1 and the second surface S2 is, for instance, an aspheric surface for correction of spherical aberration. The second lens L2 includes a third surface S3 and a forth surface S4, wherein the third surface S3 is, for instance, a concave surface. In another embodiment, the third surface S3 can be designed as a convex surface. Moreover, the forth surface S4 is, for instance, a concave surface for balance of chromatic aberration, such as axial color and lateral color.

The third lens L3 includes a fifth surface S5 and a sixth surface S6, wherein the fifth surface S5 is, for instance, a concave surface, and the sixth surface S6 is, for instance, a convex surface. The third lens L3 can provide refractive power to the optical lens 100 and correct astigmatism. The fourth lens L4 includes a seventh surface S7 and a eighth surface S8. A center area of the seventh surface S7 near the optical axis 110 is a convex surface, and a center area of the eighth surface S8 near the optical axis 110 is a concave surface for correction of off-axis aberration, such as coma and astigmatism. The fifth lens L5 includes a ninth surface S9 and a tenth surface S10, wherein a peripheral area of the ninth surface S9 away from the optical axis 110 includes an inflection point P, a center area of the ninth surface S9 near the optical axis 110 is a convex surface, and a center area of the tenth surface S10 near the optical axis 110 is a concave surface for correction of off-axis aberration, such as coma and astigmatism.

The first lens L1, the second lens L2 and the third lens L3 of this embodiment are, for instance, made of plastic, however, in another embodiment, the first lens L1, the second lens L2 and the third lens L3 can be made of glass. The first lens L1, the second lens L2 and the third lens L3 which are manufactured by glass molding respectively have a higher refractive index, so that the optical lens 100 has better imaging performance. Moreover, the fourth lens L4 and the fifth lens L5 can be made of plastic or glass. The fourth lens L4 and the fifth lens L5 respectively have a refractive index in the range of, for instance, 1.5 to 1.7, however, the present invention is not limited thereto.

The optical lens 100 of this embodiment can further include an aperture stop 120 set on the first surface S1 of the first lens L1 (shown in the dotted lines). In addition, the optical lens 100 can further include a filter 130 set between the fifth lens L5 and an imaging surface 140. The filter 130 is, for instance, an infrared cut (IR cut) filter to avoid affecting the imaging color by infrared light. However, the present invention is not limited to the type of the filter 130. Depending on usage requirements, the filter 130 can also be omitted.

The followings will describe the preferred embodiment of the optical lens 100, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

TABLE 1

| Surface | Radius of curvature (mm) | Interval (mm) | Refractive index | Abbe number |
|---|---|---|---|---|
| ST | infinity | −0.066 | 1.335 | 0 |
| S1 | 2.288 | 0.715 | 1.544 | 55.914 |
| S2 | −2.519 | 0.038 | | |

TABLE 1-continued

| Surface | Radius of curvature (mm) | Interval (mm) | Refractive index | Abbe number |
|---|---|---|---|---|
| S3 | −9.868 | 0.220 | 1.637 | 23.231 |
| S4 | 4.510 | 0.399 | | |
| S5 | −2.496 | 0.626 | 1.544 | 55.914 |
| S6 | −0.989 | 0.149 | | |
| S7 | 3.813 | 0.299 | 1.531 | 56.043 |
| S8 | 1.139 | 0.259 | | |
| S9 | 1.170 | 0.300 | 1.637 | 23.231 |
| S10 | 0.958 | 0.758 | | |
| S11 | infinity | 0.210 | equal to the refractive index of BK7 glass | 3.133 |

As shown in Table 1, the surface ST is the surface of the aperture stop 120, and the surface S11 is the surface of the filter 130. A value of the interval of each surface as shown in Table 1 is a straight line distance between this surface and the adjacent surface on right side along the optical axis 110. For example, the value of the interval of the first surface S1 of the first lens L1 is the straight line distance between the first surface S1 and the first imaging side surface S2 along the optical axis 110. It should be noted that the value of the interval of the surface ST is the straight line distance between the surface ST and the first surface S1 along the optical axis 110. Because the first surface S1 is on left side of the surface ST, the value of the interval of the surface ST is represented as negative.

In this embodiment, all of the first lens L1, the second lens L2, the third lens L3, the fourth lens L4 and the fifth lens L5 are, for instance, aspheric lenses, wherein the shapes of the first surface S1, the second surface S2, the third surface S3, the fourth surface S4, the fifth surface S5, the sixth surface S6, the seventh surface S7, the eighth surface S8, the ninth surface S9, and the tenth surface S10 fit the following aspheric equation:

$$Z(h) = \frac{h^2/r}{1+\sqrt{1-(1+k)(h^2/r^2)}} + C_2 h^2 + C_4 h^4 + C_6 h^6 + C_8 h^8 + C_{10} h^{10} \ldots$$

In this equation, "Z(h)" presents sag alone the optical axis 110, "r" is the radius of curvature adjacent to the optical axis 110 (as shown in Table 1). "k" is a conic constant. "h" is the height of aspheric, which is the distance from the center of the lens to the edge of the lens. Each of "$C_2$", "$C_4$", "$C_6$", "$C_8$", "$C_{10}$", "$C_{12}$" and "$C_{14}$" is an aspheric coefficient, wherein "$C_2$" of each of the surfaces S1 to S10 is zero. The remaining values are detailed in Tables 2 and 3 below.

TABLE 2

| | S1 | S2 | S3 | S4 | S5 |
|---|---|---|---|---|---|
| k | −7.187 | −5.590 | 5.018E+01 | −1.961E+01 | −4.405E+01 |
| $C_4$ | −1.233E−02 | −3.160E−01 | −8.851E−02 | 1.584E−01 | −3.981E−01 |
| $C_6$ | −1.337E−01 | 2.066E−01 | 5.264E−02 | −2.974E−01 | 7.572E−01 |
| $C_8$ | 1.575E−01 | −7.770E−01 | −1.127E+00 | 3.977E−01 | −5.082E−01 |
| $C_{10}$ | −9.860E−01 | 2.153E+00 | 3.636E+00 | −1.311E+00 | −2.048E+00 |
| $C_{12}$ | 1.657E+00 | −3.108E+00 | −4.909E+00 | 1.953E+00 | 4.420E+00 |
| $C_{14}$ | −1.468E+00 | 1.614E+00 | 2.382E+00 | −1.310E+00 | −3.044E+00 |

TABLE 3

|  | S6 | S7 | S8 | S9 | S10 |
|---|---|---|---|---|---|
| k | −9.891E−01 | −5.011E+01 | −2.642E+00 | −7.150E−01 | −3.031E+00 |
| $C_4$ | 6.846E−02 | 8.497E−03 | −1.407E−01 | −3.665E−01 | −1.908E−01 |
| $C_6$ | −6.199E−02 | −1.381E−01 | 5.053E−02 | 1.030E−01 | 6.884E−02 |
| $C_8$ | −7.572E−02 | 3.794E−02 | −3.569E−02 | −1.117E−02 | −1.798E−02 |
| $C_{10}$ | 2.067E−01 | 9.649E−03 | 1.683E−02 | −6.315E−04 | 5.564E−03 |
| $C_{12}$ | −2.974E−01 | −5.563E−03 | −4.577E−03 | 1.128E−03 | −8.158E−04 |
| $C_{14}$ | 1.511E−01 | −2.818E−03 | 6.374E−04 | −2.996E−04 | 5.427E−07 |

The optical lens 100 of the present embodiment can reduce aberration and has high resolution via the first, second, third, fourth and fifth lenses L1, L2, L3, L4 and L5 which have the positive, negative, positive, negative and negative refractive power, respectively. Moreover, since the optical lens 100 fits at least one of the following conditions: 0.52<(TH1+TH2+TH3)/EFL<1.0; 0.5<(TH3+TH4+TH5)/EFL<0.65; and (TH1+TH2+TH3)/(TH3+TH4+TH5)>1.20, the optical lens 100 of the present embodiment can have a short total length and be easily manufactured. For example, if (TH1+TH2+TH3)/EFL<0.52, the thickness of each of the first lens L1, the second lens L2 and the third lens L3 would be too thin to be easily manufactured. It will increase cost of manufacture. If (TH1+TH2+TH3)/EFL>1.0, the thickness of each of the first lens L1, the second lens L2 and the third lens L3 would be too thick so that the total length of the optical lens 100 would be too long.

Figure 2C:
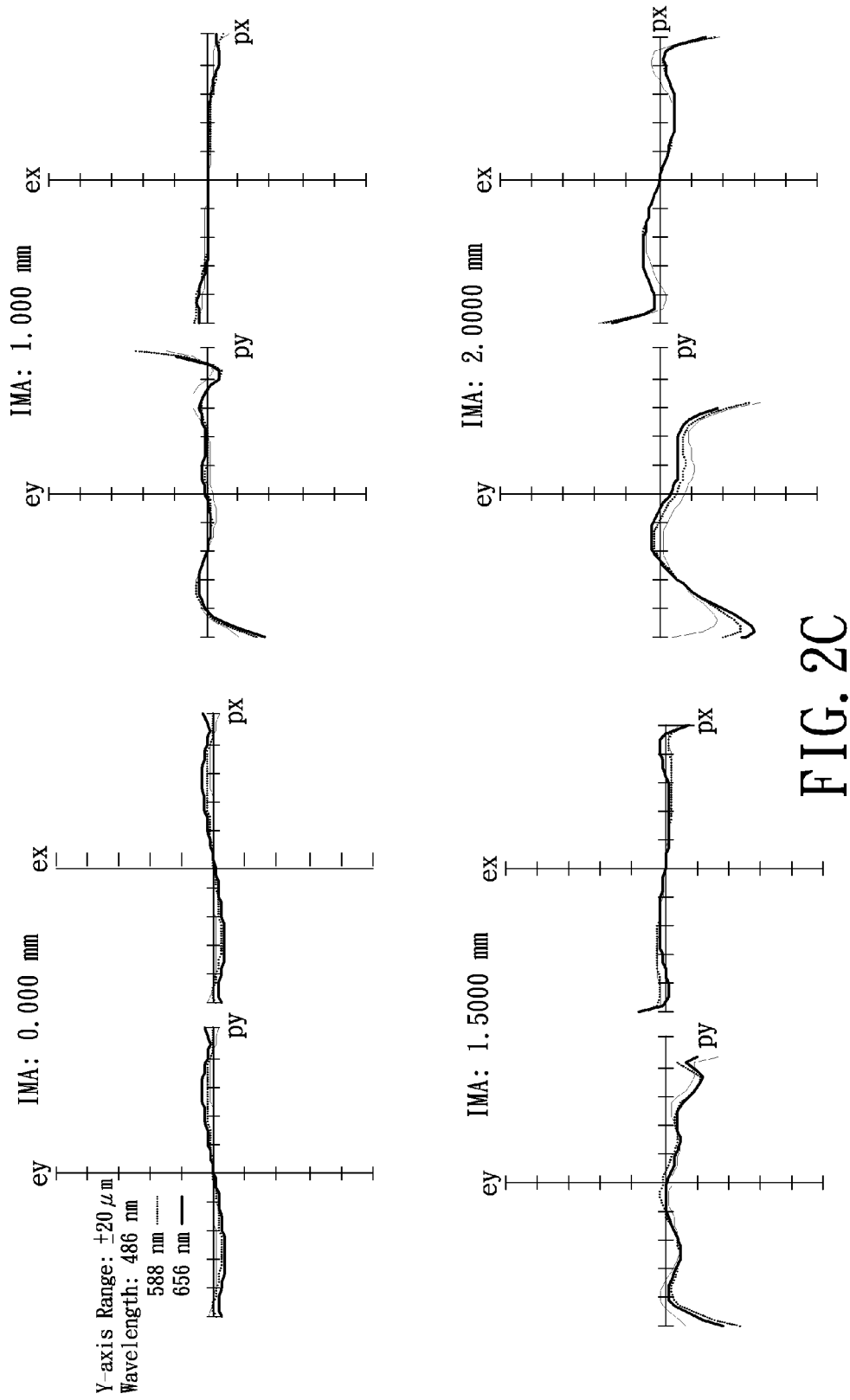
FIG. 2C is a transverse ray fan plot of four different fields of view of an optical lens in accordance with an embodiment of the present invention.

FIG. 2A and FIG. 2B are a field curvature diagram and a distortion diagram of an optical lens in accordance with an embodiment of the present invention, and FIG. 2C is a transverse ray fan plot of four different fields of view of an optical lens in accordance with an embodiment of the present invention. Since curve lines as shown in FIGS. 2A to 2C are within the standard, the optical lens 100 of this embodiment can have good imaging quality.

Figure 3:
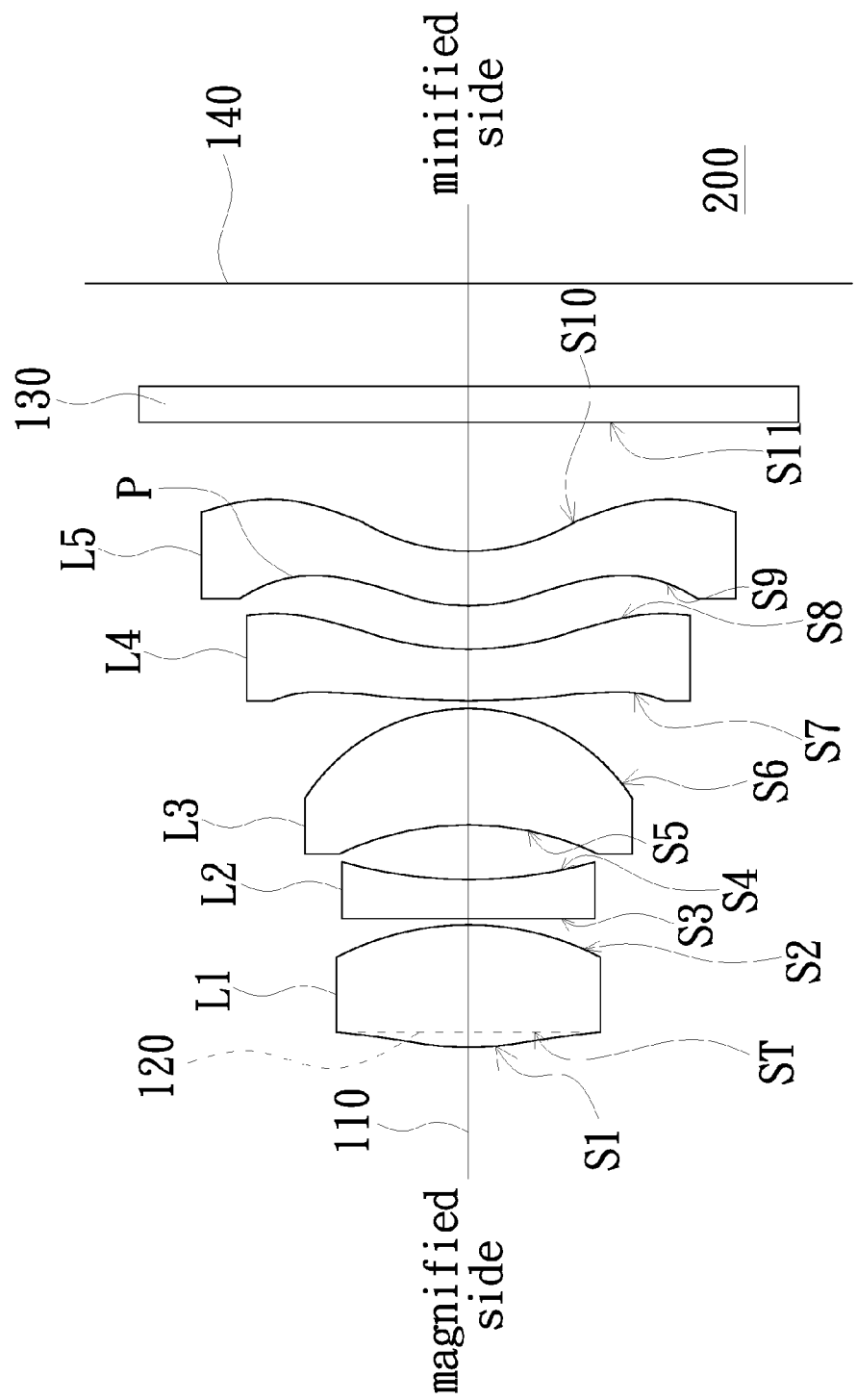
FIG. 3 is a schematic structural view of an optical lens in accordance with another embodiment of the present invention.

FIG. 3 is a schematic structural view of an optical lens in accordance with another embodiment of the present invention. Referring to FIG. 3, the structure and advantages of the optical lens 200 of this embodiment are similar to the above optical lens 100, so that in this embodiment, the same portions of the optical lenses 100 and 200 will not be mentioned repeatedly. The major differences between the optical lenses 100 and 200 is that the third surface S3 of the second lens L2 of the optical lens 200 of this embodiment is a convex surface. The followings will describe values of one embodiment of the optical lens 200. Please refer to Tables 4 to 6.

TABLE 4

| Surface | Radius of curvature (mm) | Interval (mm) | Refractive index | Abbe number |
|---|---|---|---|---|
| ST | infinity | −0.070 |  | 0 |
| S1 | 2.182 | 0.750 | 1.544 | 55.914 |
| S2 | −2.355 | 0.040 |  |  |
| S3 | 17.129 | 0.245 | 1.830 | 23.231 |
| S4 | 2.681 | 0.324 |  |  |
| S5 | −2.343 | 0.715 | 1.544 | 55.914 |
| S6 | −0.962 | 0.050 |  |  |
| S7 | 5.399 | 0.320 | 1.544 | 55.914 |
| S8 | 1.649 | 0.273 |  |  |
| S9 | 1.147 | 0.320 | 1.544 | 55.914 |
| S10 | 0.825 | 0.803 |  |  |
| S11 | infinity | 0.210 | equal to the refractive index of BK7 glass | 3.856 |

As shown in Table 4, the surface ST is the surface of the aperture stop 120, and the surface S11 is the surface of the filter 130. In this embodiment, all of the first lens L1, the second lens L2, the third lens L3, the fourth lens L4 and the fifth lens L5 are, for instance, aspheric lenses, wherein the shapes of the first surface S1, the second surface S2, the third surface S3, the forth surface S4, the fifth surface S5, the sixth surface S6, the seventh surface S7, the eighth surface S8, the ninth surface S9, the tenth surface S10 fit the above aspheric equation, wherein values of the radius of curvature of the surfaces S1 to S10 are shown in Table 4, and "$C_2$" of each of the surfaces S1 to S10 is zero. The remaining values are detailed in Tables 5 and 6 below.

TABLE 5

|  | S1 | S2 | S3 | S4 | S5 |
|---|---|---|---|---|---|
| k | −4.993 | −9.610 | −4.995E+01 | −1.213E+01 | −3.207E+01 |
| $C_4$ | −5.281E−04 | −2.105E−01 | −8.333E−02 | 8.117E−02 | −3.385E−01 |
| $C_6$ | −1.012E−01 | 8.568E−02 | 3.518E−02 | −1.824E−01 | 4.561E−01 |
| $C_8$ | 1.164E−01 | −5.221E−01 | −6.092E−01 | 3.614E−01 | −1.355E−01 |
| $C_{10}$ | −7.844E−01 | 1.670E+00 | 2.379E+00 | −7.685E−01 | −1.418E+00 |
| $C_{12}$ | 1.302E+00 | −2.253E+00 | −2.931E+00 | 1.340E+00 | 1.916E+00 |
| $C_{14}$ | −8.858E−01 | 1.056E+00 | 1.222E+00 | −8.629E−01 | −7.013E−01 |

TABLE 6

|  | S6 | S7 | S8 | S9 | S10 |
|---|---|---|---|---|---|
| k | −2.096E+00 | −5.231E+01 | −1.773E+00 | −1.111E+00 | −2.774E+00 |
| $C_4$ | −2.627E−02 | 5.647E−02 | −1.043E−01 | −3.112E−01 | −1.482E−01 |

TABLE 6-continued

|  | S6 | S7 | S8 | S9 | S10 |
|---|---|---|---|---|---|
| $C_6$ | −1.241E−01 | −9.840E−02 | 3.375E−02 | 6.793E−02 | 4.147E−02 |
| $C_8$ | 5.868E−02 | 3.161E−02 | −2.460E−02 | −1.002E−02 | −1.157E−02 |
| $C_{10}$ | 1.327E−01 | −3.322E−03 | 9.840E−03 | −2.876E−04 | 2.719E−03 |
| $C_{12}$ | −3.003E−01 | −7.565E−03 | −3.145E−03 | 1.046E−03 | −5.387E−04 |
| $C_{14}$ | 1.484E−01 | 2.631E−03 | 5.930E−04 | 1.038E−05 | 8.887E−05 |

Figure 4C:
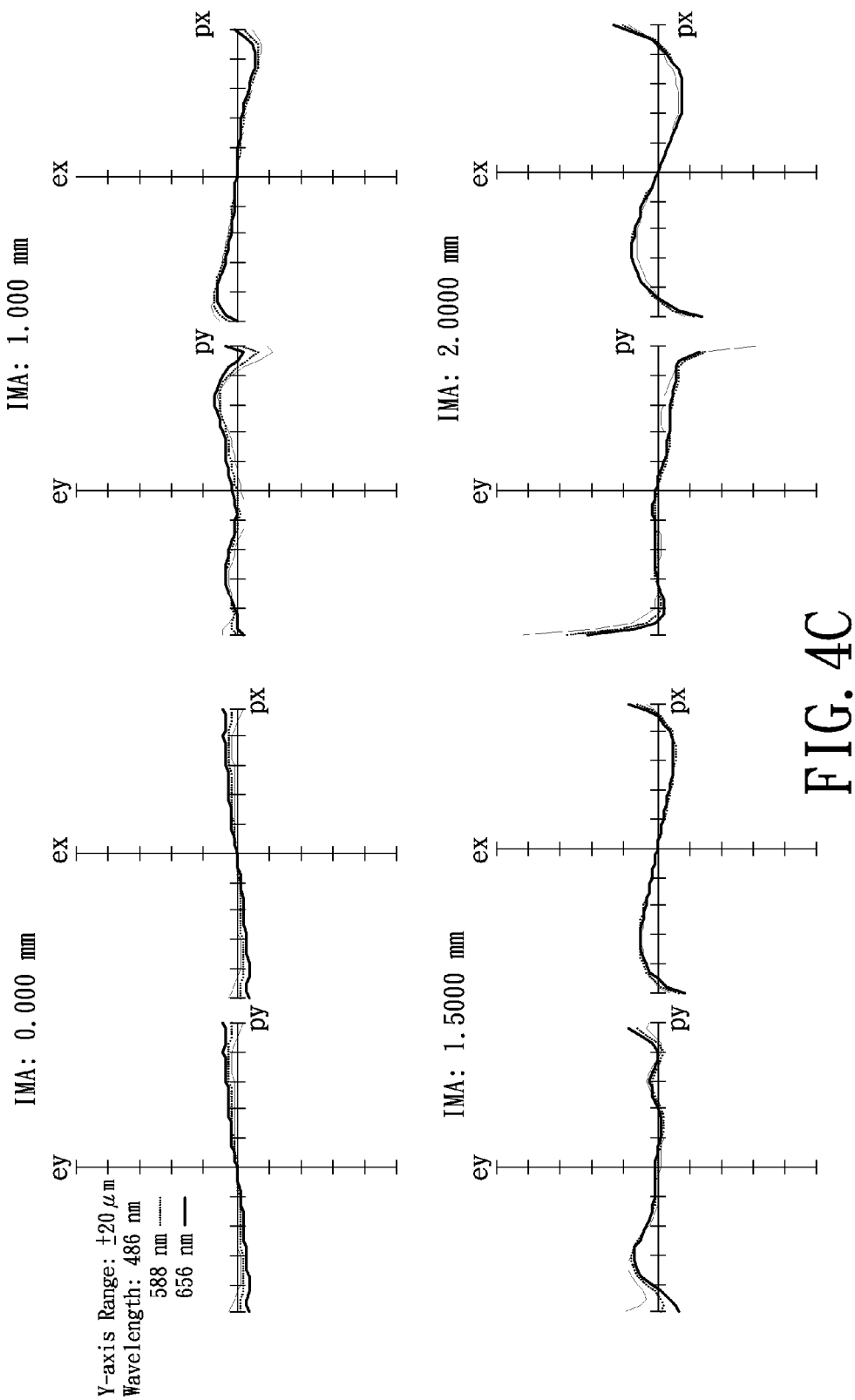
FIG. 4C is a transverse ray fan plot of four different fields of view of an optical lens in accordance with another embodiment of the present invention.

FIG. 4A and FIG. 4B are a field curvature diagram and a distortion diagram of an optical lens in accordance with an embodiment of the present invention, and FIG. 4C is a transverse ray fan plot of four different fields of view of an optical lens in accordance with an embodiment of the present invention. Since curve lines as shown in FIGS. 4A to 4C are within the standard, the optical lens 200 of this embodiment can have good imaging quality.

In summary, the optical lens of the present invention can reduce aberration and has high resolution via the first, second, third, fourth and fifth lenses which have the positive, negative, positive, negative and negative refractive power, respectively. Moreover, the optical lens fits at least one of the following conditions: 0.52<(TH1+TH2+TH3)/EFL<1.0; 0.5<(TH3+TH4+TH5)/EFL<0.65; and (TH1+TH2+TH3)/(TH3+TH4+TH5)>1.20, and therefore the optical lens of the present invention can have a short total length, and be easily manufactured.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical lens, comprising:
a first lens, a second lens, a third lens, a fourth lens and a fifth lens arranged along an optical axis from a magnified side to a minified side, wherein a center thickness of the first lens is TH1, a center thickness of the second lens is TH2, a center thickness of the third lens is TH3, a center thickness of the fourth lens is TH4, a center thickness of the fifth lens is TH5, an effective focal length of the optical lens is EFL, and the optical lens fits at least one of the following conditions: (1) 0.52<(TH1+TH2+TH3)/EFL<1.0; (2) 0.5<(TH3+TH4+TH5)/EFL<0.65; and (3) (TH1+TH2+TH3)/(TH3+TH4+TH5)>1.20, and wherein the third lens includes a surface facing the minified side, and the fourth lens includes a surface facing the magnified side, and wherein an end point of the surface facing the minified side of the third lens closest to the minified side projects onto the light axis to form a first projection point, and an end point of the surface facing the magnified side of the fourth lens closest to the magnified side projects onto the light axis to form a second projection point, and wherein the first projection point is located between the second projection point and the magnified side.

2. The optical lens according to claim 1, wherein the first lens has positive refractive power, the second lens has negative refractive power, the third lens has positive refractive power, the fourth lens has negative refractive power, and the fifth lens has negative refractive power.

3. The optical lens according to claim 1, wherein the first lens fits at least one of the following conditions: (1) being a biconvex lens; (2) including a first surface and a second surface, wherein at least one of the first surface and the second surface is an aspheric surface; and (3) including a first surface, wherein an aperture stop is set in front of the first surface of the first lens.

4. The optical lens according to claim 1, wherein the second lens includes a surface facing the magnified side and a surface facing the minified side, and the surface facing the minified side is a concave surface.

5. The optical lens according to claim 1, wherein the third lens further includes a surface facing the magnified side, the surface facing the magnified side is a concave surface, and the surface facing the minified side is a convex surface.

6. The optical lens according to claim 1, wherein the fourth lens fits at least one of the following conditions: (1) further including a surface facing the minified side, wherein a center area of the surface facing the magnified side near the optical axis is a convex surface, and a center area of the surface facing the minified side near the optical axis is a concave surface; and (2) having a refractive index in a range of 1.5 to 1.7.

7. The optical lens according to claim 1, wherein the fifth lens fits at least one of the following conditions: (1) including a surface facing the magnified side and a surface facing the minified side, wherein a center area of the surface facing the magnified side near the optical axis is a convex surface, a peripheral area of the surface facing the magnified side away from the optical axis has an inflection point, and a center area of the surface facing the minified side near the optical axis is a concave surface; (2) and having a refractive index in a range of 1.5 to 1.7.

8. The optical lens according to claim 1, wherein all of the first lens, the second lens, the third lens, the fourth lens and the fifth lens are aspheric lenses.

9. The optical lens according to claim 1, further comprising a filter, wherein the fifth lens is disposed between the fourth lens and the filter.

10. An optical lens, comprising a first lens, a second lens, a third lens, a fourth lens and a fifth lens arranged along an optical axis from a magnified side to a minified side, wherein the first lens has positive refractive power, the second lens has negative refractive power, the third lens has positive refractive power, the fourth lens has negative refractive power, and the fifth lens has negative refractive power, and wherein the third lens includes a surface facing the minified side, and the fourth lens includes a surface facing the magnified side, and wherein an end point of the surface facing the minified side of the third lens closest to the minified side projects onto the light axis to form a first projection point, and an end point of the surface facing the magnified side of the fourth lens closest to the magnified side projects onto the light axis to form a second projection point, and wherein the first projection point is located between the second projection point and the magnified side.

11. The optical lens according to claim 10, wherein a center thickness of the first lens is TH1, a center thickness of the second lens is TH2, a center thickness of the third lens is TH3, an effective focal length of the optical imaging lens is EFL, and 0.52<(TH1+TH2+TH3)/EFL<1.0.

12. The optical lens according to claim 10, wherein a center thickness of the third lens is TH3, a center thickness of the fourth lens is TH4, a center thickness of the fifth lens is TH5, an effective focal length of the optical imaging lens is EFL, and 0.5<(TH3+TH4+TH5)/EFL<0.65.

13. The optical lens according to claim 10, wherein a center thickness of the first lens is TH1, a center thickness of the second lens is TH2, a center thickness of the third lens is TH3, a center thickness of the fourth lens is TH4, a center thickness of the fifth lens is TH5, an effective focal length of the optical imaging lens is EFL, and (TH1+TH2+TH3)/(TH3+TH4+TH5)>1.20.

14. The optical imaging lens according to claim 10, wherein the first lens fits at least one of the following conditions: (1) being a biconvex lens; (2) including a first surface and a second surface, wherein at least one of the first surface and the second surface is an aspheric surface; and (3) including a first surface, wherein an aperture stop is set in front of the first surface of the first lens.

15. The optical imaging lens according to claim 10, wherein the second lens includes a surface facing the magnified side and a surface facing the minified side, and the surface facing the minified side is a concave surface.

16. The optical imaging lens according to claim 10, wherein the third lens further includes a facing the magnified side surface, the surface facing the magnified side is a concave surface, and the surface facing the minified side is a convex surface.

17. The optical imaging lens according to claim 10, wherein the fourth lens fits at least one of the following conditions: (1) further including surface facing the minified side, wherein a center area of the surface facing the magnified side near the optical axis is a convex surface, and a center area of the surface facing the minified side near the optical axis is a concave surface; and (2) having a refractive index in a range of 1.5 to 1.7.

18. The optical imaging lens according to claim 10, wherein the fifth lens fits at least one of the following conditions: (1) including a surface facing the magnified side and a surface facing the minified side, wherein a center area of the surface facing the magnified side near the optical axis is a convex surface, a peripheral area of the surface facing the magnified side away from the optical axis has an inflection point, and a center area of the surface facing the minified side near the optical axis is a concave surface; (2) and having a refractive index in a range of 1.5 to 1.7.

19. The optical imaging lens according to claim 10, wherein all of the first lens, the second lens, the third lens, the fourth lens and the fifth lens are aspheric lenses.

20. The optical lens according to claim 10, further comprising a filter, wherein the fifth lens is disposed between the fourth lens and the filter.

* * * * *